(12) United States Patent
Jabr et al.

(10) Patent No.: US 9,380,005 B2
(45) Date of Patent: Jun. 28, 2016

(54) RELIABLE TRANSPORTATION OF A STREAM OF PACKETS USING PACKET REPLICATION

(75) Inventors: Khalil A. Jabr, Lake Oswego, OR (US); Naveen Kumar R (Ramalingappa), Karnataka (IN); Sandesh Kumar B Narappa, Karnataka (IN); Sudhakar Shenoy, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/329,369

(22) Filed: Dec. 19, 2011

(65) Prior Publication Data

US 2013/0114593 A1     May 9, 2013

(30) Foreign Application Priority Data

Nov. 3, 2011   (IN) .......................... 3132/DEL/2011

(51) Int. Cl.
| | |
|---|---|
| *H04L 12/28* | (2006.01) |
| *H04L 12/939* | (2013.01) |
| *H04L 12/703* | (2013.01) |
| *H04L 12/773* | (2013.01) |

(52) U.S. Cl.
CPC ............... *H04L 49/552* (2013.01); *H04L 45/28* (2013.01); *H04L 45/60* (2013.01)

(58) Field of Classification Search
None
See application file for complete search history.

(56) References Cited

U.S. PATENT DOCUMENTS

| | | | |
|---|---|---|---|
| 5,404,352 A | 4/1995 | Pauwels et al. | |
| 6,674,715 B1 * | 1/2004 | Yamada | 370/220 |
| 7,310,306 B1 | 12/2007 | Cheriton | |
| 2001/0048662 A1 * | 12/2001 | Suzuki et al. | 370/230 |
| 2002/0021661 A1 | 2/2002 | DeGrandepre et al. | |
| 2005/0018668 A1 * | 1/2005 | Cheriton | 370/389 |

(Continued)

OTHER PUBLICATIONS

Bryant et al., "Pseudowire Emulation Edge-to-Edge (PWE3) Control Word for Use over an MPLS PSN," Feb. 2006, RFC 4385, http://tools.ietf.org/pdf/rfc4385.pdf, The Internet Society, Reston, VA, USA (twelve pages).

(Continued)

*Primary Examiner* — Thai Nguyen
(74) *Attorney, Agent, or Firm* — The Law Office of Kirk D. Williams

(57) ABSTRACT

In one embodiment, a device receives a first packet stream and a second packet stream over different paths through a network, wherein each of said sent first and the second packet streams includes a same replicated stream of packets. The apparatus processes packets of the first packet stream when the first packet stream is in an active packet stream, and while buffering and subsequently dropping packets of the second packet stream when the second packet stream is in a non-active state. In response to identifying a difference in a number of packets in the same replicated stream of packets received in the second packet stream compared to in the first packet stream equaling or exceeding a predetermined threshold, the second packet stream becomes in the active state and missing packets are forwarded from the buffered second stream packets.

11 Claims, 9 Drawing Sheets

(56) References Cited

U.S. PATENT DOCUMENTS

| | | | |
|---|---|---|---|
| 2005/0163115 A1* | 7/2005 | Dontu et al. | 370/389 |
| 2006/0013210 A1* | 1/2006 | Bordogna et al. | 370/389 |
| 2006/0153219 A1* | 7/2006 | Wong et al. | 370/432 |
| 2006/0221825 A1* | 10/2006 | Okano | 370/229 |
| 2010/0085873 A1* | 4/2010 | Moons | 370/230 |
| 2010/0172361 A1* | 7/2010 | Scholl et al. | 370/401 |
| 2012/0176890 A1* | 7/2012 | Balus et al. | 370/218 |
| 2012/0257626 A1* | 10/2012 | McGhee et al. | 370/392 |
| 2012/0257627 A1* | 10/2012 | Nguyen et al. | 370/392 |
| 2013/0107699 A1* | 5/2013 | Miclea | 370/228 |

OTHER PUBLICATIONS

Bocci et al., "MPLS Generic Associated Channel," Jun. 2009, RFC 5586, http://tools.ietf.org/pdf/rfc5586.pdf, The Internet Society, Reston, VA, USA (nineteen pages).

"Understanding Sonet UPSRs," Sep. 7, 2011, http://www.sonet.com/EDU/upsr.htm, Sonet Sig, San Jose, CA, USA (four pages).

* cited by examiner

RELIABLE TRANSPORTATION OF A STREAM OF PACKETS USING PACKET REPLICATION

TECHNICAL FIELD

The present disclosure relates generally to communicating information over a network between two networked devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Different techniques are employed, including those included in a protocol used to communicate packets, as well as path protection for being able to quickly reroute traffic when a particular path no longer becomes available.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
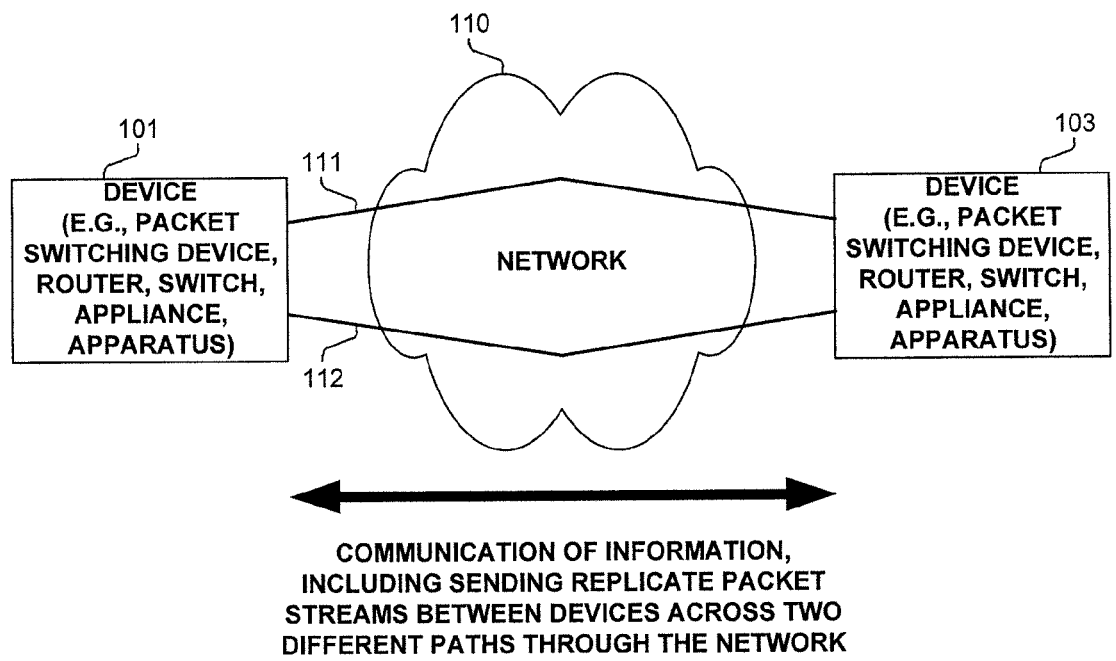
FIG. 1 illustrates a network configured to operate, and/or operating, according to one embodiment.

Disclosed are, inter alia, methods, apparatus, computer-storage media, mechanisms, and means associated with reliably transporting a stream of packets using packet replication. One embodiment includes an apparatus, such as, but not limited to, a packet switching device (e.g., router, switch, bridge), networked appliance, or networked host device.

In one embodiment, the apparatus receives a first packet stream and a second packet stream over different paths through a network, wherein each of said sent first and the second packet streams includes a replicated stream of packets. The apparatus processes packets of the first packet stream when the first packet stream is in an active state, and while buffering and subsequently dropping packets of the second packet stream when the second packet stream is in a non-active state. In response to identifying a difference in a number of packets in the same replicated stream of packets received in the second packet stream compared to in the first packet stream equaling or exceeding a predetermined threshold: the apparatus switches the second packet stream to be in the active state, which includes processing, by the apparatus, one or more packets of said buffered packets and subsequently received packets of the second packet stream, and switching the first packet stream to be in a non-active state.

In one embodiment, said identified difference in the number of packets is determined based on information acquired from one or more fields of packets received in both the first and the second streams of packets. In one embodiment, packets in each of the first packet stream and the second packet stream include sequence numbers; and wherein said identified difference in the number of packets is determined based on said sequence numbers. In one embodiment, the predetermined threshold is at least three packets. In one embodiment, the predetermined threshold is at least twenty packets. In one embodiment, each of said sent first and the second packet streams comprises the same replicated stream of packets. In one embodiment, the first packet and the second packet stream are received from a particular apparatus; and wherein the particular apparatus selectively determines which packets from the first packet stream are in the same replicated stream of packets; and wherein the same replicated stream of packets includes less than all of the packets in the first packet stream.

2. Description

Disclosed are, inter alia, methods, apparatus, computer-storage media, mechanisms, and means associated with reliably transporting a stream of packets using packet replication. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1 illustrates a network configured to operate, and/or operating, according to one embodiment. As shown, device 101 communicates, or is configured to communicate, a same stream of packets over both network paths 111 and 112 through network 110 to device 103. This same stream of packets may be the only one, or one of many, packet streams communicated over network paths 111 and/or 112.

Figure 2A:
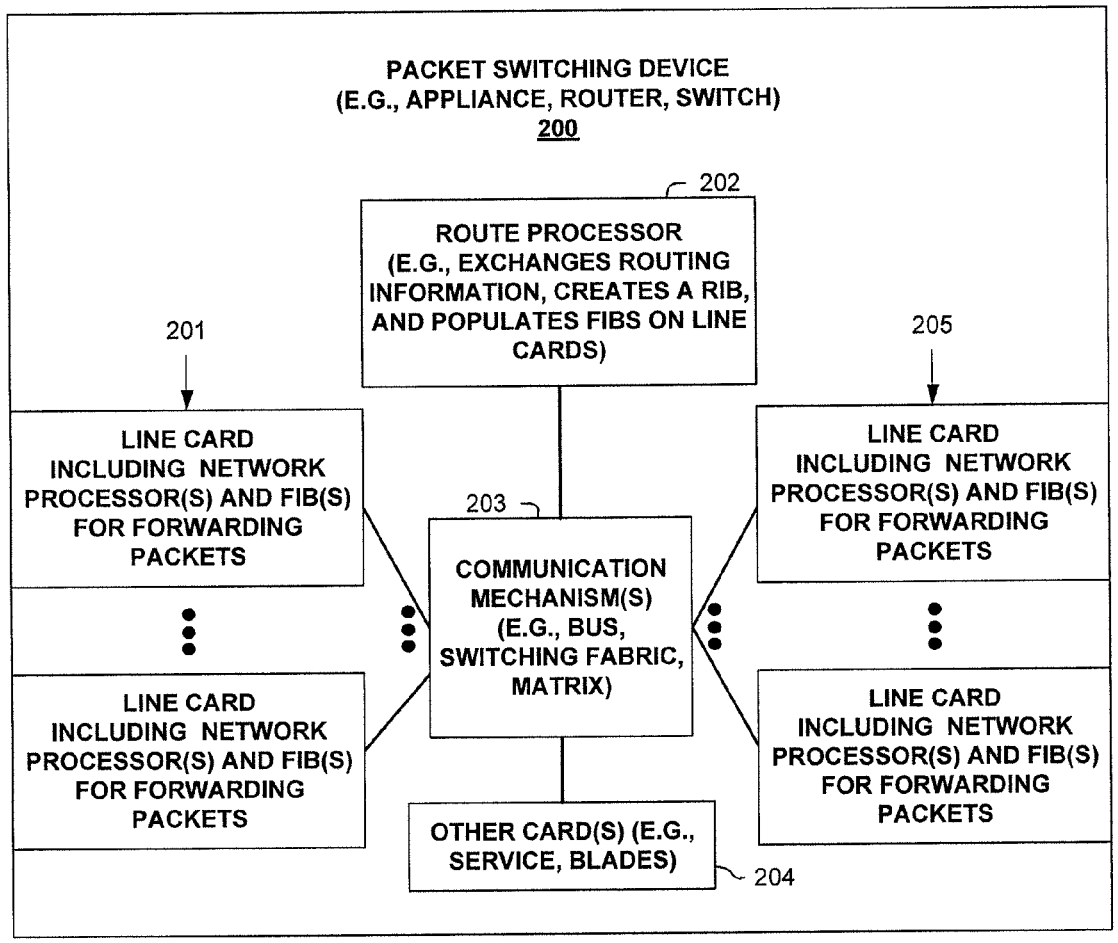
FIG. 2A illustrates a packet switching device configured to operate, and/or operating, according to one embodiment.

One embodiment of packet switching device 200 (e.g., appliance, router, switch bridge) is illustrated in FIG. 2A. As shown, packet switching device 200 includes line cards 201 and 205, each with one or more FIBs for use in forwarding packets. Additionally, packet switching device 200 also has a route processor 202, which typically manages the control plane by communicating routing information with other packet switching devices, populates one or more RIBs, and populates one or more FIBs in line cards 201 and 205. Packet switching device 200 also includes other cards 204 (e.g., service cards, blades), and some communication mechanism 203 (e.g., bus, switching fabric, matrix) for allowing its different entities 201, 202, 204 and 205 to communicate.

Figure 2B:
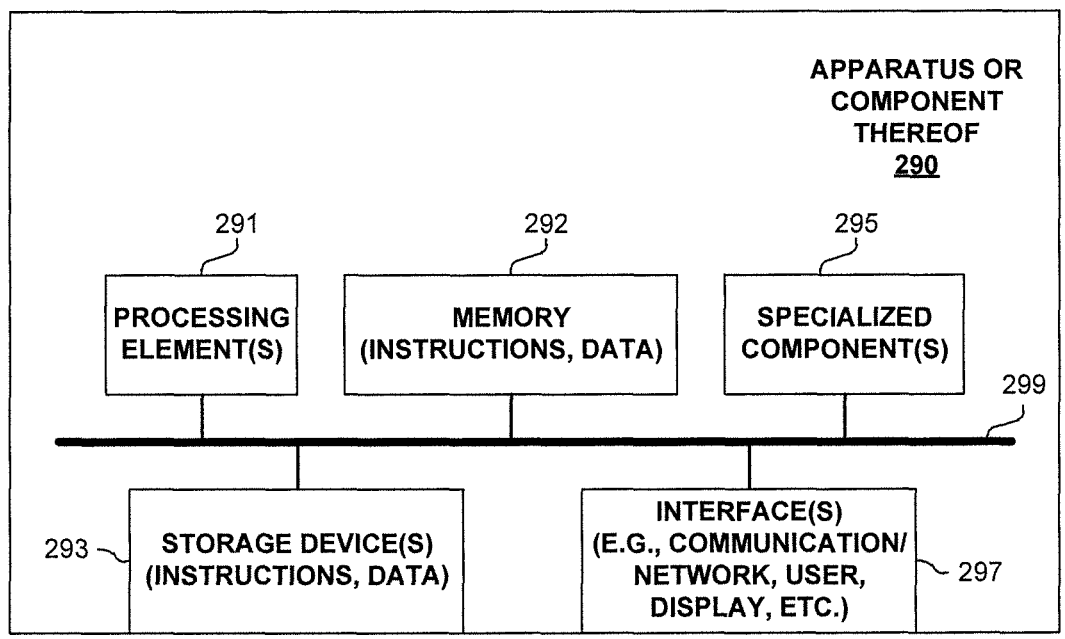
FIG. 2B illustrates an apparatus or component configured to operate, and/or operating, according to one embodiment.

FIG. 2B is a block diagram of an apparatus or component 290 used in one embodiment associated with reliably transporting a stream of packets using packet replication. In one embodiment, apparatus or component 290 performs one or more processes corresponding to one of the flow diagrams illustrated or otherwise described herein, and/or illustrated in another diagram or otherwise described herein.

In one embodiment, apparatus or component 290 includes one or more processing element(s) 291, memory 292, storage device(s) 293, specialized component(s) 295 (e.g. optimized hardware such as for performing operations, etc.), and interface(s) 297 for communicating information (e.g., sending and receiving packets, user-interfaces, displaying information, etc.), which are typically communicatively coupled via one or more communications mechanisms 299, with the communications paths typically tailored to meet the needs of a particular application. In one embodiment apparatus or component 290 corresponds to, or is part of, device 101 or 103 of FIG. 1, packet switching device 200 of FIG. 2A, packet switching device 310 or 330 of FIG. 3A, or packet switching device 400 of FIG. 4A.

Various embodiments of apparatus or component 290 may include more or fewer elements. The operation of apparatus or component 290 is typically controlled by processing element(s) 291 using memory 292 and storage device(s) 293 to perform one or more tasks or processes. Memory 292 is one type of computer-readable/computer-storage medium, and typically comprises random access memory (RAM), read only memory (ROM), flash memory, integrated circuits, and/or other memory components. Memory 292 typically stores computer-executable instructions to be executed by processing element(s) 291 and/or data which is manipulated by processing element(s) 291 for implementing functionality in accordance with an embodiment. Storage device(s) 293 are another type of computer-readable medium, and typically comprise solid state storage media, disk drives, diskettes, networked services, tape drives, and other storage devices. Storage device(s) 293 typically store computer-executable instructions to be executed by processing element(s) 291 and/or data which is manipulated by processing element(s) 291 for implementing functionality in accordance with an embodiment.

Figure 3A:
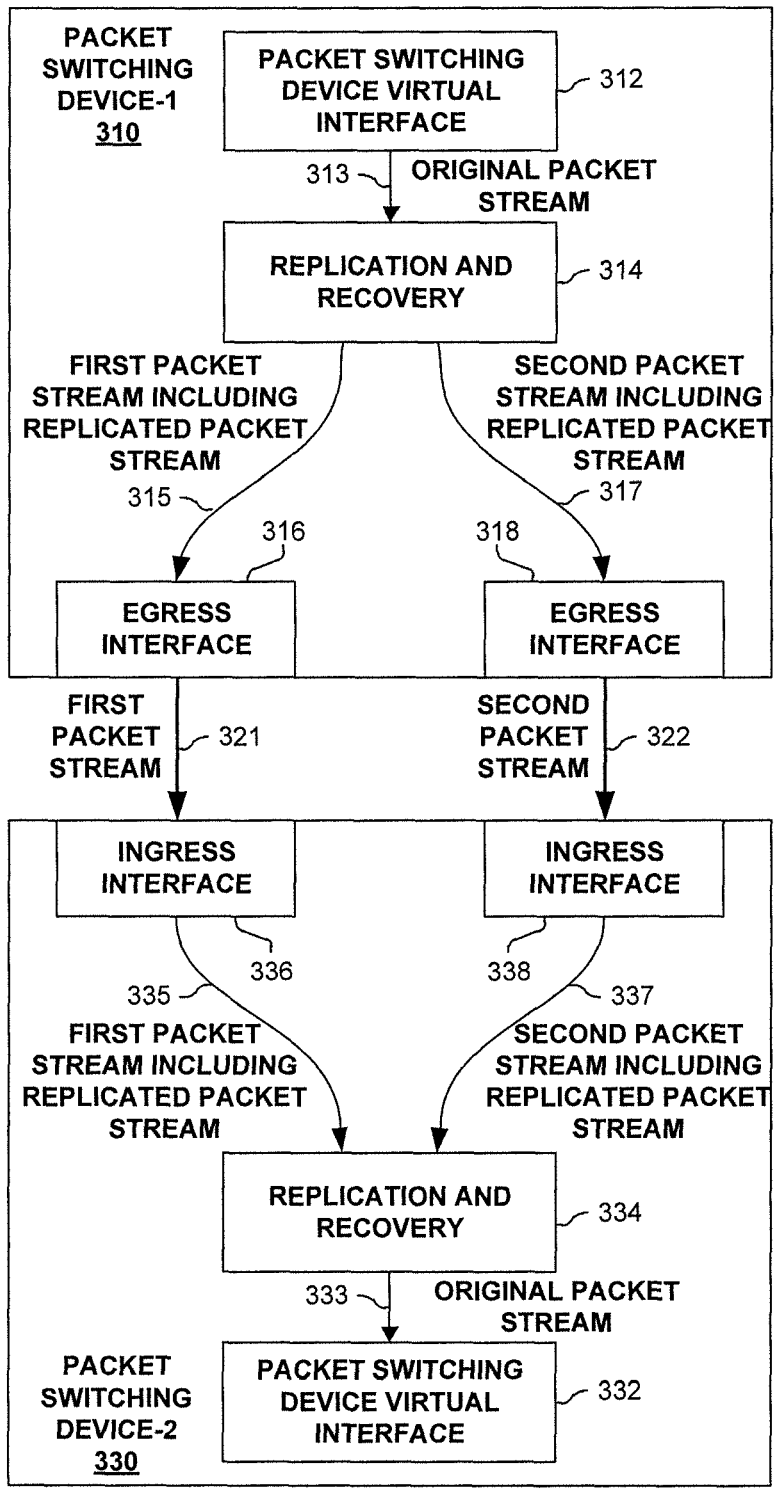
FIG. 3A illustrates an apparatus configured to operate, and/or operating, according to one embodiment.

FIG. 3A illustrates the operation of packet switching device 310 communicating an original packet stream 313 to packet switching device 330 by replicating original packet stream 313 and sending it in two packet streams 321 and 322 according to one embodiment.

As shown, packet switching device 310 includes packet switching device virtual interface 312, which is produces original packet stream 313. Virtual interfaces and their operation are well known in the packet switching device industry. Original packet stream 313 is received by replication and recovery entity 314, which produces first packet stream (including a replicated packet stream) 315 and second packet stream (including the replicated packet stream) 317. First and second packet streams 315 and 317 are respectively communicated to egress interfaces 316 and 318, for transporting first and second packet streams across different paths (321, 322) to packet switching device 330.

In other words, each of first and second packet streams 315 and 317 include a replicated packet stream. In one embodiment, each of first and second packet streams 315 and 317 is identical to original packet stream 313. However, sending a replicated packet stream across a network incurs extra resources compared to those required to send a single copy of a packet stream across a network. So, in one embodiment, replication and recovery entity 314 selects less than all packets (e.g., based on priority, source address, source port, destination address, destination port, deep-packet inspection) of original packet stream 313 to be replicated and included in each of first and second packet streams 315 and 317.

Packet switching device 330 receives first packet stream 321 on ingress interface 336 with first packet stream 335 communicated to a same replication and recovery entity 334, and second packet stream 322 on ingress interface 338 with second packet stream 337 communicated to replication and recovery entity 334. Replication and recovery entity 334 reproduces original stream 313 as long as each packet in original packet stream 313 is included in either first packet stream 335 or second packet stream 337. Replication and recovery entity 334 provides original packet stream 333 to packet switching device virtual interface 332.

One embodiment therefore inserts a reliable transmission mechanism between virtual interfaces 312 and 332, which does not require a modification of the packet switching performed behind these virtual interfaces 312 and 332. Also, using packet replication to simultaneously send multiple copies of a packet eliminates the latency required to respond to a lost packet or a detected network or hardware failure, which require the sending device to retransmit a copy of a missing packet.

Figure 3B:
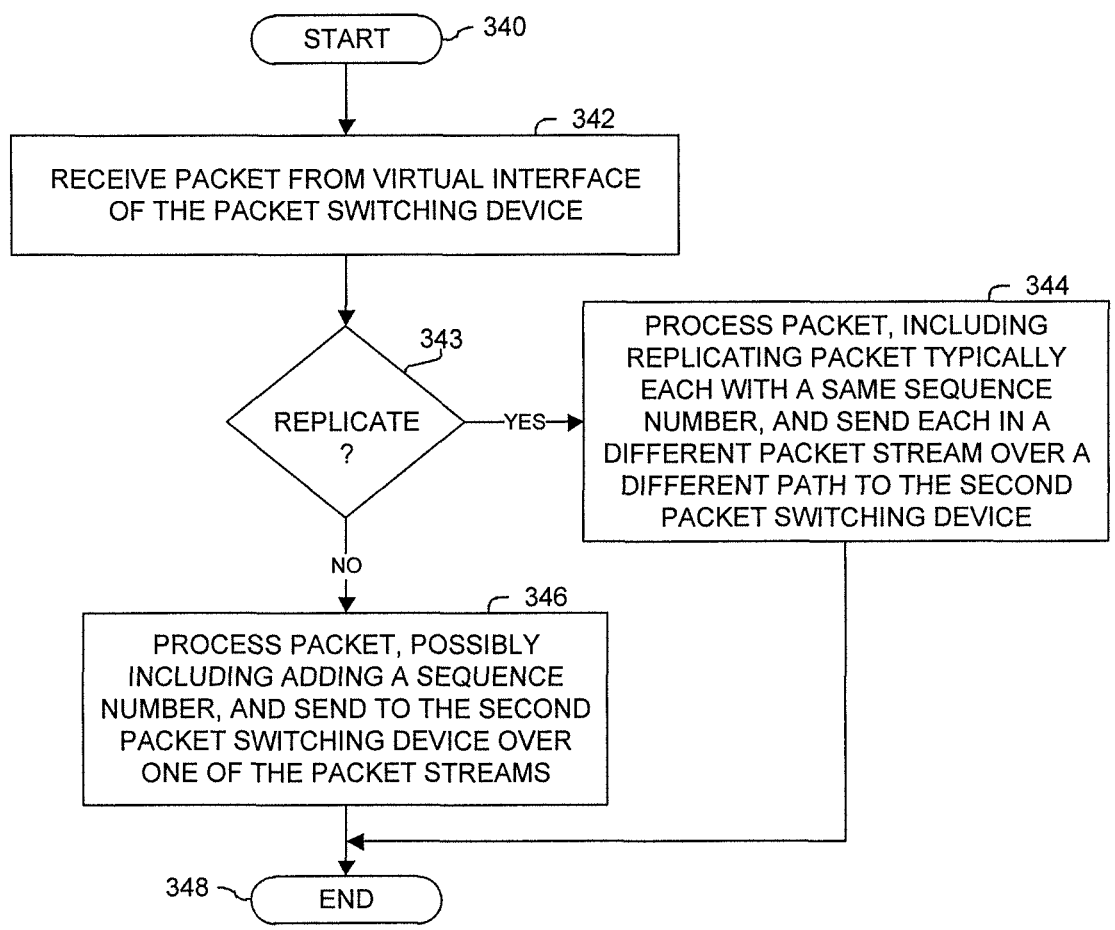
FIGS. 3B-D illustrates processes configured to be performed, and/or performed, in one embodiment.

FIG. 3B illustrates a process according to one embodiment, for example, but not limited to, some operations performed by packet switching device 310 of FIG. 3A. Processing begins with process block 340. In process block 342, a packet is received from a virtual interface of the packet switching device.

As determined in process block 343, if the packet is to be replicated (e.g., all packets, selecting less than all packets), then in process block 344, the packet is processed, including producing multiple copies (e.g., two or more—one for each of the multiple paths between devices) of the received packet. Typically, each of these packets has a sequence number added to it in a location (e.g., control word, label, header) consistent with that of the transport mechanism used (e.g., pseudowire, tunnel, virtual circuit, physical circuit). This sequence number allows the receiver to quickly identify that a packet is being sent over multiple paths to it, and which packet is a replicate of another packet (e.g., has the same sequence number). These replicated packets are sent over different paths to the receiving device.

Otherwise, in process block 343 it was determined that a single copy of the packet was to be sent, and in process block 346, the received packet is processed, possibly adding a sequence number (e.g., for ordering or other purposes in reproducing the original stream), and the packet is sent over one of the paths to the receiving device. Processing of the flow diagram of FIG. 3B is complete as indicated by process block 348.

Figure 3C:
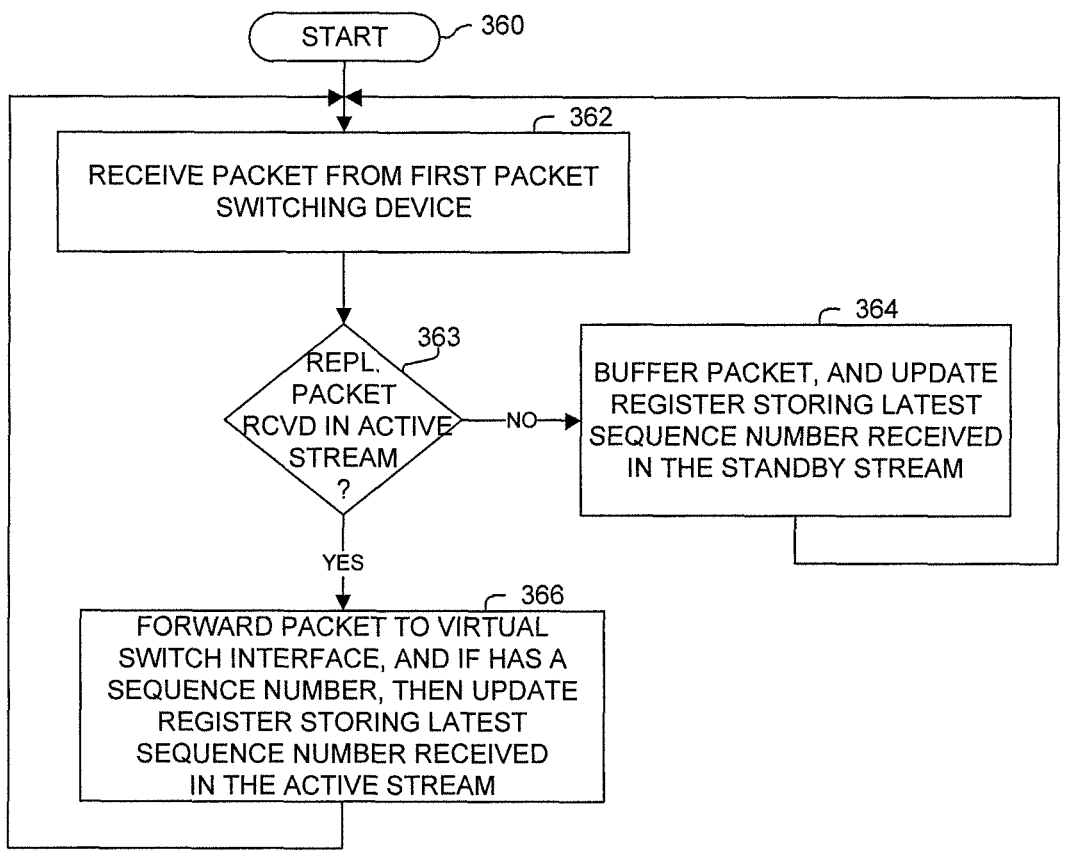

FIG. 3C illustrates a process according to one embodiment, for example, but not limited to, some operations performed by packet switching device 330 of FIG. 3A. Note, one embodiment uses a technique which designates one packet stream as being in an active state, with one or more other packet streams being in a non-active (e.g., standby) state. A non-active packet stream (e.g., a packet stream in a non-active state) is used for replacing the currently active packet stream (e.g., a packet stream in an active state) in case of detected failure or degradation, typically includes using buffered packets from a non-active packet stream to fill in missing packets from the previously active packet stream.

Processing begins with process block 360. In process block 362, a packet is received from the sending packet switching device. As determined in process block 363, if it is a replicated packet received on non-active packet stream (e.g., not received in the active packet stream), then in process block 364, the packet is buffered and the register storing the latest sequence number received on this non-active packet stream is updated with the sequence number of the received packet. Otherwise, it was determined in process block 363 that the replicated packet was received in the active packet stream, and in process block 366, the packet is forwarded to a virtual interface, and if it has a sequence number, the register storing the latest sequence number received on this active packet stream is updated with the sequence number of the received packet. Processing returns to process block 362 to receive and process another packet.

Figure 3D:
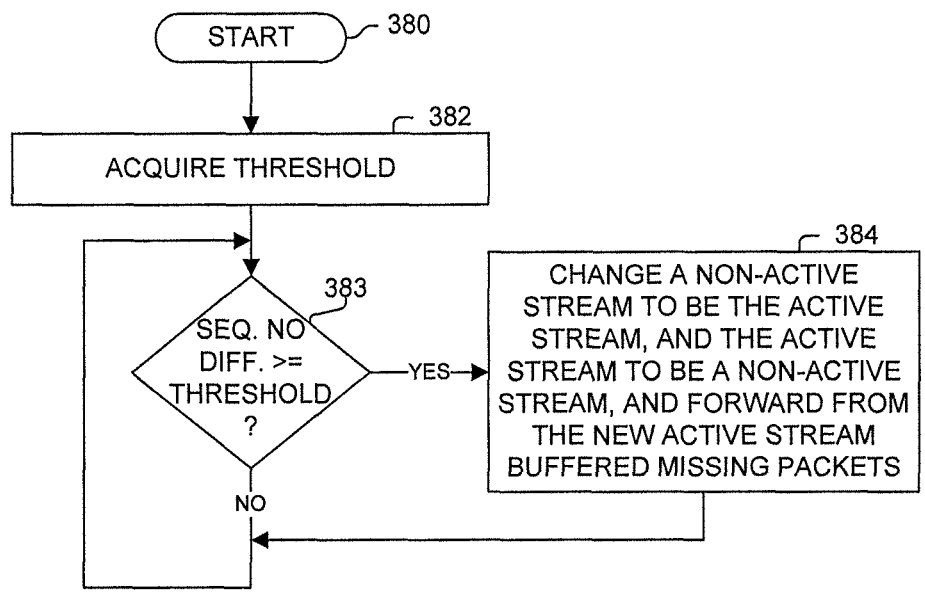

FIG. 3D illustrates a process according to one embodiment, for example, but not limited to, some operations performed by packet switching device 330 of FIG. 3A. Processing begins with process block 380. In process block 382, a threshold value is acquired for use in deciding whether to switch to a non-active stream, based on a difference between a last sequence number received in the active packet stream compared to the last sequence number received in a non-active packet stream. This threshold value is typically a manufacturer or operator specified value, or dynamically determined based on the buffering capacity for the non-active stream in light of a desired switch over rate. This threshold value should be such that the apparatus could switch from the active packet stream to the non-active packet stream without losing any packets from the non-active packet stream (e.g., based on the available buffer space). In one embodiment, this predetermined threshold value is at least two packets, such as, but not limited to, five, ten, twenty, thirty or more packets.

Next, as determined in process block 383, if the difference in sequence numbers between the active packet stream and one of the one or more non-active packet streams exceeds this predetermined threshold value (e.g., acquired per process block 382), then in process block 384, the active packet stream is switched to being a non-active packet stream, and the corresponding non-active packet stream is made the active packet stream. Also, packets from the last sequence number recorded for the previously active packet stream are sent from the buffer of the previously non-active packet stream. These streams are processed according to the appropriate process explained in relation to FIGS. 3B and 3C. Processing returns to process block 383.

Figure 4A:
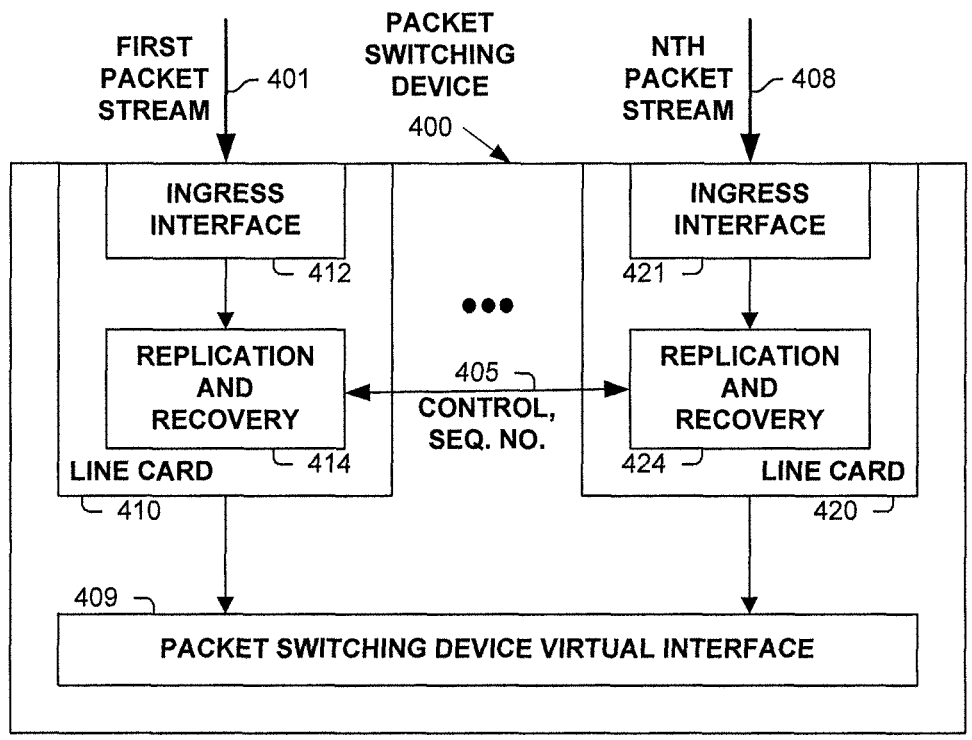
FIG. 4A illustrates an apparatus configured to operate, and/or operating, according to one embodiment.

FIG. 4A illustrates the operation of packet switching device 400 configured to receive multiple packet streams 401-408 (e.g., one or more active packet streams, typically each with corresponding one or more non-active packet streams), and therefrom, to produce and provide an original packet stream (sent to it from a remote device) to packet switching device virtual interface 409. One embodiment of packet switching device 400 operates similarly to that described herein in relation to FIGS. 3A-D.

One embodiment of packet switching device 400 provides for replication and recovery entities 414 and 424 (corresponding to active and non-active packet streams 401-408) to be located in different places within packet switching device 400, such as, but not limited to being, on different line cards 410, 420. In this one embodiment, intercommunication is provided between these differently located replication and recovery entities 414 and 424 to communicate (405) latest sequence numbers received, as well as control information (e.g., coordination of the role of the packet streams being in an active or non-active state).

In one embodiment, a replication and recovery entity corresponding to a non-active packet stream receives sequence number updates from a replication and recovery entity associated with the active packet stream for use in determining (and initiating the switch) when to switch the non-active packet stream to become the active packet stream, and vice versa. In one embodiment, a replication and recovery entity corresponding to an active packet stream determining (and initiating the switch) sequence number updates from a replication and recovery entity associated with the non-active packet stream(s) for use in determining when to switch the non-active packet stream to become the active packet stream, and vice versa. In one embodiment, a centralized replication and recovery entity is used, which receives sequence number updates from replication and recovery entities associated with the active and non-active packet streams for use in determining (and initiating the switch) when to switch a non-active packet stream to become the active packet stream, and vice versa.

Further, many networks provide fast reroute or other mechanisms to rapidly protection switch packet traffic received on one interface to another interface of a packet switching device. To expedite the handling of such a protection switching cut over such as to operate on this packet traffic received on different interfaces, one embodiment preconfigures multiple packet streams to be in the active or non-active state, but no packets are received thereon until a network change causes a reroute of corresponding active and/or non-active packet traffic to be received on these different interfaces. Additional coordination between these entities is provided to quickly derive and produce the original packet stream.

Figure 4B:
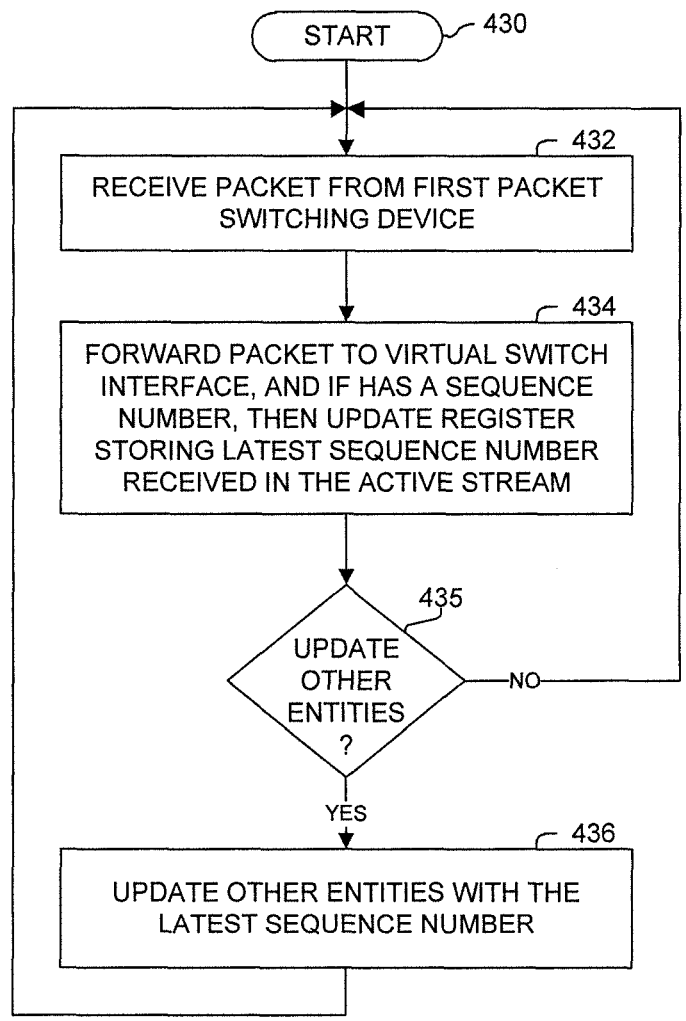
FIGS. 4B-C illustrates processes configured to be performed, and/or performed, in one embodiment.

FIG. 4B illustrates a process according to one embodiment, for example, but not limited to, some operations performed by packet switching device 400 of FIG. 4A for a currently active packet stream. Processing begins with process block 430. In process block 432, a packet is received from the remote packet switching device. In process block 434, the received packet is forwarded to the virtual interface. If the packet has a sequence number, then a register maintaining the latest sequence number received on the active packet stream is updated accordingly. As determined in process block 435, if one or more replication and recovery entities should be updated with the latest sequence number, then in process block 436, one or more replication and recovery entities should be updated with the latest sequence number. One embodiment performs this update for each new sequence number received. However, this operation incurs some overhead on the packet switching device, thus, one embodiment periodically performs this operation only after an expired time period, such as defined by some number (e.g., two, five, ten, etc.) of updates to the sequence number. Processing of the flow diagram of FIG. 4B returns to process block 432.

Figure 4C:
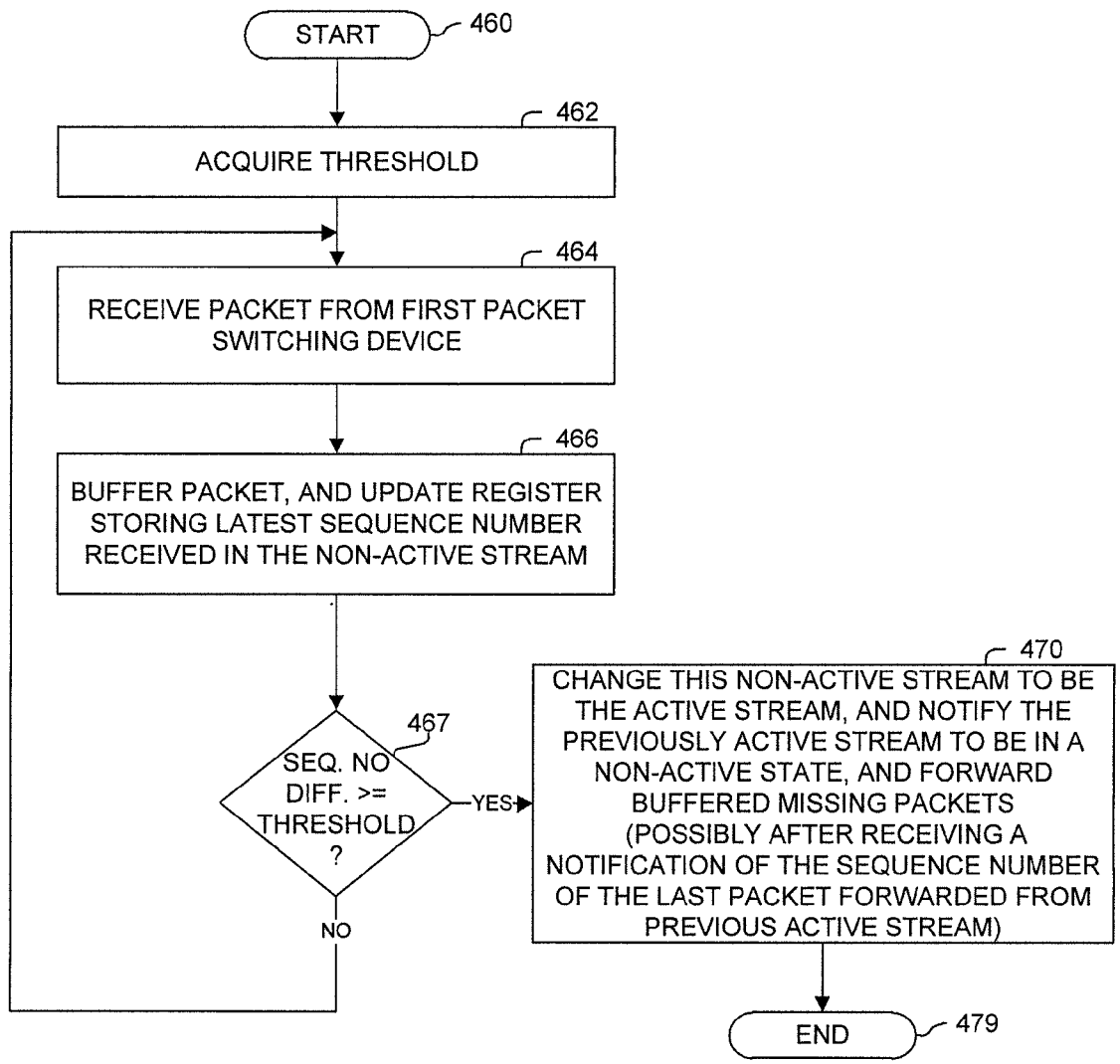

FIG. 4C illustrates a process according to one embodiment, for example, but not limited to, some operations performed by packet switching device 400 of FIG. 4A for a currently non-active packet stream. Processing begins with process block 460. In process block 462, a threshold value is acquired for use in deciding whether to switch to a non-active stream, based on a difference between a last sequence number received in the active packet stream compared to the last sequence number received in a non-active packet stream. This threshold value is typically a manufacturer or operator specified value, or dynamically determined based on the buffering capacity for the non-active stream in light of a desired switch over rate. This threshold value should be such that the apparatus could switch from the active packet stream to the non-active packet stream without losing any packets from the non-active packet stream (e.g., based on the available buffer space). In one embodiment, this predetermined threshold value is at least two packets, such as, but not limited to, five, ten, twenty, thirty or more packets.

In process block 464, a packet is received from the remote packet switching device. In process block 466, the received packet is buffered, and a register maintaining the latest sequence number for this packet stream is updated accordingly.

Next, as determined in process block 467, if the difference in sequence numbers between the active packet stream and this more non-active packet stream exceeds the predetermined threshold value (e.g., acquired per process block 462), then in process block 470, the active packet stream is switched to being a non-active packet stream, and the corresponding non-active packet stream is made the active packet stream. Also, packets from the last sequence number recorded for the previously active packet stream are sent from the buffer of the previously non-active packet stream, possibly after receiving a message from the previously active packet stream specifying the last sequence number that it received and forwarded to the virtual interface (which provides more granularity than the periodically updated sequence number). Processing of the flow diagram of FIG. 4C is complete for this packet stream as indicated by process block 479. These streams are subsequently processed according to the appropriate process explained in relation to FIGS. 4B and 4C. In other words, the previously active packet stream now operates according a process corresponding to FIG. 4C (instead of that of FIG. 4B), and the newly active packet stream now operates according a process corresponding to FIG. 4B (instead of that of FIG. 4C).

Otherwise, in process block 467 it was determined to return to process block 464, to which processing proceeds.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

receiving, by a first line card within a packet switching device sent from a particular packet switching device, a first packet stream;

receiving, by a second line card, different from the first line card, within the packet switching device sent from the particular packet switching device, a second packet stream; wherein each of the first packet stream and the second packet stream includes a same replicated packet stream;

processing, by a third entity within the packet switching device and not located on the first line card and not located on the second line card, packets of the same replicated packet stream received from the first line card and the second line card;

sending, by the first line card, update messages to inform the second line card of which packets of the same replicated stream of packet in the first packet stream have been successfully received by the first line card; and while the first packet stream is in an active state and the second packet stream is in an non-active state and in response to identifying a difference between a number of packets of the same replicated packet stream received in the second packet stream and in the first packet stream equaling or exceeding to a predetermined threshold value: switching the second packet stream to be in the active state and switching the first packet stream to be in the non-active state including sending at least one packet of the same replicated packet stream buffered by the second line card while the second packet stream was in the non-active state that was not identified as being successfully received in the first packet stream by the first line card based on said update messages;

wherein when the first packet stream is in the active state: the first line card forwards packets of the same replicated packet stream in the first packet stream to the third entity; wherein when the second packet stream is in the active state: the second line card forwards packets of the same replicated packet stream in the second packet stream to the third entity; and wherein when the second packet stream is in the non-active state: the second line card buffers and then drops without forwarding to the third entity packets of the same replicated packet stream in the second packet stream.

2. The method of claim 1, wherein said switching the second packet stream to be in the active state includes the second line card sending, to the first line card, a message informing the first line card that the second packet stream is now in the active state.

3. The method of claim 1, wherein said identified difference in the number of packets is determined based on information acquired from one or more fields of packets received in both the first packet stream and the second packet stream.

4. The method of claim 1, wherein packets in each of the first packet stream and the second packet stream include sequence numbers; and wherein said identified predetermined difference in the number of packets is determined based on said sequence numbers.

5. An apparatus, comprising:
a first line card comprising: a plurality of interfaces configured for communicating packets including receiving a first packet stream; memory; and one or more processing elements configured to perform operations;
a second line card, different from the first line card, comprising: a plurality of interfaces configured for communicating packets including receiving a second packet stream; memory; and one or more processing elements configured to perform operations;
a third entity not located on the first line card and not located on the second line card;
wherein each of the first packet stream and the second packet stream includes a same replicated stream of packets;
wherein for when the first packet stream is in an active state and the second packet stream is in a non-active state: the first line card is configured to forward packets of the same replicated stream of packets in the first packet stream to the third entity; the second line card is configured to buffer and subsequently drop without forwarding to the third entity packets of the same replicated stream of packets in the second packet stream; the first line card is configured to send, to the second line card, update messages to inform the second line card of which packets of the same replicated stream of packet in the first packet stream have been successfully received; and the second line card is configured, in response to identifying a difference between a number of packets of the same replicated stream of packets received in the second packet stream and in the first packet stream equaling or exceeding a predetermined threshold to: cause the second packet stream to be in the active state including sending at least one packet of the same replicated packet stream buffered by the second line card while the second packet stream was in the non-active state and not identified as being successfully received by the first line card based on said update messages, and to send a message to the first line card communicating that the second packet stream is now in the active state causing the first packet stream to be in the non-active state; and wherein when the first packet stream is in the non-active state the first line card is configured to buffer and subsequently drop without forwarding to the third entity packets of the same replicated stream of packets in the first packet stream; and wherein when the second packet stream is in the active state the second line card is configured to forward packets of the same replicated stream of packets in the second packet stream to the third entity.

6. The apparatus of claim 5, wherein the apparatus is a packet switching device.

7. The apparatus of claim 5, wherein said identified difference in the number of packets is determined based on information acquired from one or more fields of packets received in both the first packet stream and the second packet stream.

8. The apparatus of claim 5, wherein packets in each of the first packet stream and the second packet stream include sequence numbers; and wherein said identified difference in the number of packets is determined based on said sequence numbers.

9. The apparatus of claim 5, wherein the predetermined threshold is at least three packets.

10. The apparatus of claim 5, wherein the predetermined threshold is at least twenty packets.

11. The apparatus of claim 5, wherein each of the first packet stream and the second packet stream consists of the same replicated stream of packets.

\* \* \* \* \*